United States Patent
Houtman et al.

(10) Patent No.: US 7,350,632 B2
(45) Date of Patent: Apr. 1, 2008

(54) MECHANICAL CLUTCH UNIT

(75) Inventors: Thomas Houtman, Ann Arbor, MI (US); Russell E. Monahan, Ann Arbor, MI (US)

(73) Assignee: NTN Automotive Center, Farmington Hills, MI (US)

( * ) Notice: Subject to any disclaimer, the term of this patent is extended or adjusted under 35 U.S.C. 154(b) by 254 days.

(21) Appl. No.: 11/115,613

(22) Filed: Apr. 27, 2005

(65) Prior Publication Data

US 2006/0243556 A1 Nov. 2, 2006

(51) Int. Cl.
*F16D 27/102* (2006.01)
*F16D 15/00* (2006.01)

(52) U.S. Cl. .................... 192/35; 192/38; 192/84.8
(58) Field of Classification Search ................ 192/84.8
See application file for complete search history.

(56) References Cited

U.S. PATENT DOCUMENTS

| | | | |
|---|---|---|---|
| 4,559,846 A | 12/1985 | Cochran et al. | |
| 4,715,467 A | 12/1987 | Sakai | |
| 5,195,604 A | 3/1993 | Brockett et al. | |
| 5,732,807 A * | 3/1998 | Itoh et al. | 192/38 |
| 6,244,403 B1 * | 6/2001 | Ito et al. | 192/35 |
| 6,470,771 B2 | 10/2002 | Nanri et al. | |
| 6,530,447 B2 | 3/2003 | Seki et al. | |
| 6,595,337 B2 * | 7/2003 | Goto et al. | 192/84.8 |
| 6,659,256 B2 | 12/2003 | Seki et al. | |
| 6,679,348 B2 | 1/2004 | Handa et al. | |
| 6,698,563 B2 | 3/2004 | Handa et al. | |
| 6,758,297 B2 | 7/2004 | Handa et al. | |
| 6,769,505 B2 | 8/2004 | Handa | |
| 6,786,293 B2 | 9/2004 | Handa | |
| 2002/0038736 A1 | 4/2002 | Handa | |
| 2002/0046893 A1 | 4/2002 | Handa et al. | |
| 2002/0100629 A1 | 8/2002 | Handa et al. | |
| 2002/0104703 A1 | 8/2002 | Goto et al. | |
| 2002/0170795 A1 * | 11/2002 | Yasui et al. | 192/35 |
| 2003/0209378 A1 | 11/2003 | Handa | |
| 2003/0213634 A1 | 11/2003 | Handa | |
| 2004/0003953 A1 | 1/2004 | Goto et al. | |
| 2004/0097321 A1 | 5/2004 | Handa et al. | |
| 2004/0182670 A1 * | 9/2004 | Nojiri et al. | 192/38 |

FOREIGN PATENT DOCUMENTS

JP 2003-301865 A * 10/2003

* cited by examiner

*Primary Examiner*—Richard M Lorence
(74) *Attorney, Agent, or Firm*—Warn Partners, P.C.

(57) ABSTRACT

The present invention provides clutch systems for the control of the transmission of torque to the front (or rear) wheels of a vehicle (e.g., an ATV), thus being operable to change the vehicle from a two-wheel, rear-drive (or front-drive) vehicle to a four wheel drive vehicle by engaging the clutch systems thereof. The clutch system is contained within an extended portion of a housing that also contains a differential system, thus eliminating the need for fastening a separate clutch system housing to the differential housing. The clutch system is actuated by energizing a coil which in turn causes tab members of an actuation disk to disengage from notches formed on an inner race, allowing the actuation of a roller clutch system. When the coil is de-energized, the actuation disk engages the inner race and prevents inadvertent or undesired actuation of the clutch system.

38 Claims, 6 Drawing Sheets

MECHANICAL CLUTCH UNIT

FIELD OF THE INVENTION

The present invention relates generally to clutches, and more particularly, to clutch systems useful in conjunction with four wheel drive control systems for all-terrain vehicles (ATV's), although the present invention can also be practiced with automotive drivelines. More specifically, the present invention provides clutch systems for the control of the transmission of torque to the front (or rear) wheels, thus being operable to change the vehicle from a two-wheel, rear-drive (or front-drive) vehicle to a four wheel drive vehicle by engaging the clutch systems thereof.

BACKGROUND OF THE INVENTION

Currently, a variety of different clutch systems are used for various vehicles, such as ATV's, including roller clutch systems. Many of these clutch systems employ a dog clutch or splined collar arrangement that can be engaged by pulling a lever. Additionally, there are some electronically-actuated clutch systems that have been recently developed, as well.

These roller clutch systems are typically packaged in their own housings and bolted to the front transmission output flanges. The inner race is typically splined to the male output shaft from the transmission, whereas the clutch outer race has a female spline that is adapted to the front drive shaft. For example, certain roller clutch systems employ a roller clutch in a separate housing bolted to the front differential housing. In most of these systems, the input comes from the front driveshaft, and is connected to the roller clutch outer race. The clutch inner race is splined onto the front differential's pinion shaft.

One disadvantage with conventional roller clutch systems is that the dog clutch can be damaged during engagement while the vehicle is moving, as well as being complex and expensive to design and manufacture. Additionally, because separate housings are employed for the differential and clutch units, separate seals are needed on the input and output portions, and the clutch unit is required to be pre-greased before final assembly. Furthermore, ball bearings and a needle roller bearing are generally required to position the parts relative to each other and within the clutch housing. Also, the coil wire must be fed through the outer wall at the back end of the clutch housing during installation of the coil, a process that is quite time-consuming and difficult.

Therefore, there exists a need for new and improved clutch systems, especially those operable to provide control of the transmission of torque to the front (or rear) wheels, thus being operable to change the vehicle from a two-wheel, rear-drive (or front-drive) vehicle to a four wheel drive vehicle by engaging the clutch systems thereof.

SUMMARY OF THE INVENTION

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

In accordance with a first embodiment of the present invention, a selectively operable clutch system for a vehicle is provided, comprising: (1) an inner race member; (2) an outer race member, a portion of which is disposed about a portion of the inner race member; (3) an actuation member operably associated with the inner race member; and (4) an actuation system operably associated with the actuation member, wherein the actuation system is operable to cause the actuation member to either engage or disengage the inner race member, wherein when the actuation member is engaged with the inner race member, the clutch system is not operable to apply a torque force to a drivable member, wherein when the actuation member is disengaged from the inner race member, the clutch system is operable to apply a torque force to a drivable member.

In accordance with a second embodiment of the present invention, a selectively operable clutch system for a vehicle is provided, comprising: (1) an inner race member; (2) an outer race member, a portion of which is disposed about a portion of the inner race member; (3) a roller clutch system operably associated with the inner and outer race members; (4) an actuation member operably associated with the inner race member; and (5) an actuation system operably associated with the actuation member, wherein the actuation system is operable to cause the actuation member to either engage or disengage the inner race member, wherein when the actuation member disengages from the inner race member, the roller clutch system is operable to cause the inner and outer race members to rotate together in the same direction, wherein when the actuation member is engaged with the inner race member, the roller clutch system is not operable to apply a torque force to a drivable member, wherein when the actuation member is disengaged from the inner race member, the roller clutch system is operable to apply a torque force to a drivable member.

In accordance with a third embodiment of the present invention, a selectively operable torque transmission system for a vehicle is provided, comprising: (1) a differential system disposed within a housing; and (2) a clutch system, wherein the housing includes an extended portion operable to receive at least a portion of the clutch system, wherein the clutch system is operably associated with the differential system, wherein the clutch system comprises: (a) an inner race member; (b) an outer race member, a portion of which is disposed about a portion of the inner race member; (c) a roller clutch system operably associated with the inner and outer race members; (d) an actuation member operably associated with the inner race member; and (e) an actuation system operably associated with the actuation member, wherein the actuation system is operable to cause the actuation member to either engage or disengage the inner race member, wherein when the actuation member disengages from the inner race member, the roller clutch system is operable to cause the inner and outer race members to rotate together in the same direction, wherein when the actuation member is engaged with the inner race member, the roller clutch system is not operable to apply a torque force to a drivable member, wherein when the actuation member is disengaged from the inner race member, the roller clutch system is operable to apply a torque force to a drivable member.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
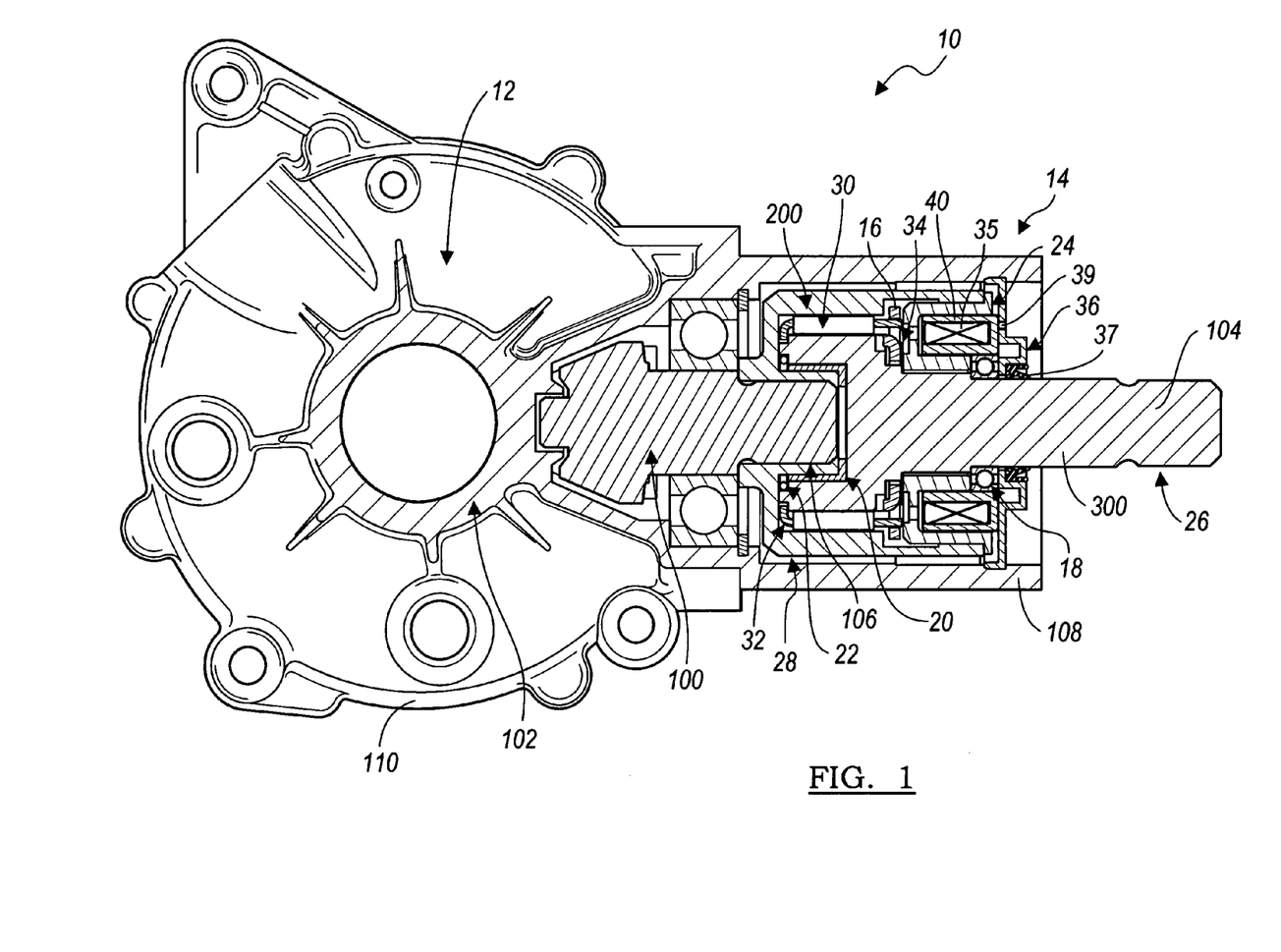
FIG. 1 illustrates a broken-away view of a differential system incorporating a clutch system, in accordance with the general teachings of the present invention.
Figure 2:
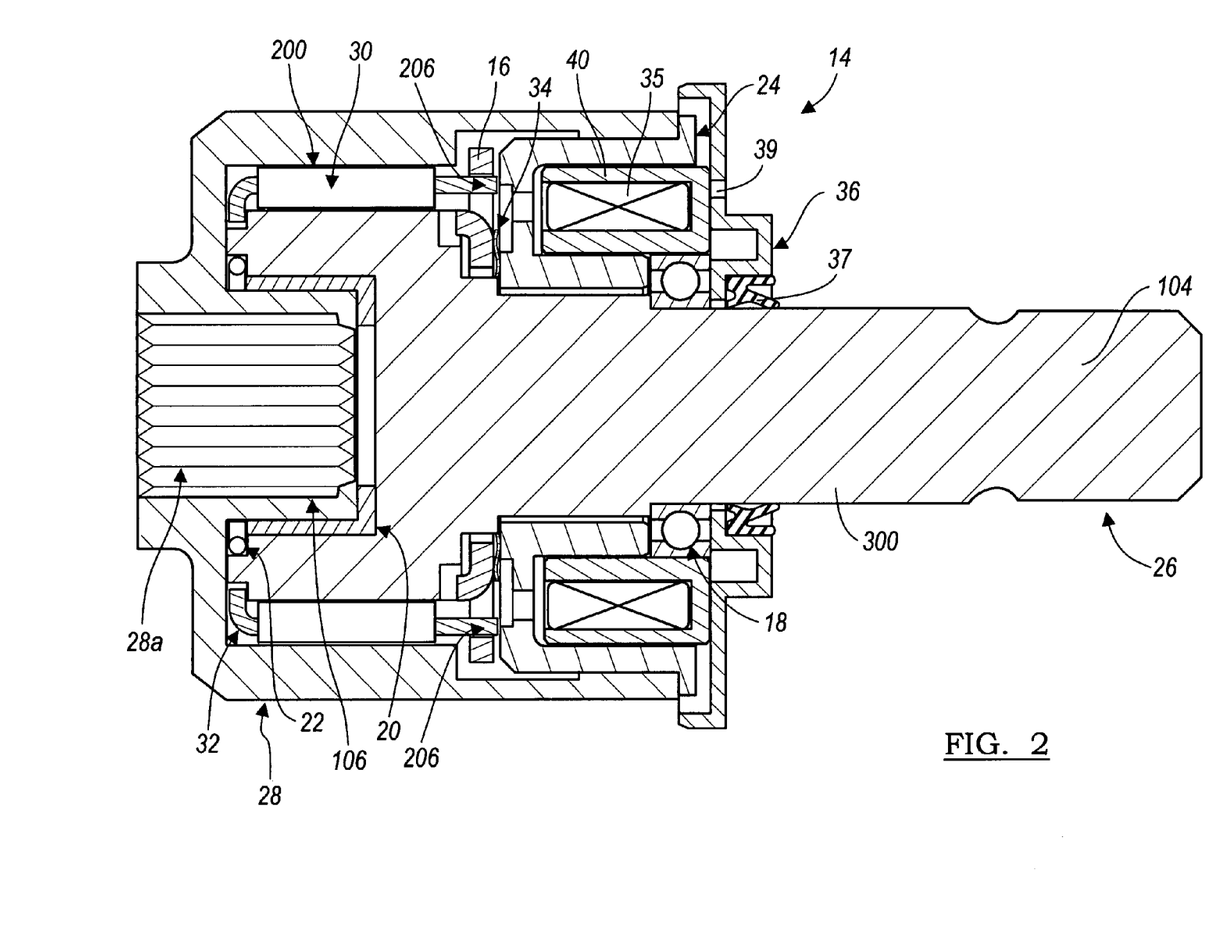
FIG. 2 illustrates a sectional view of a clutch system, in accordance with a first embodiment of the present invention.
Figure 3A:
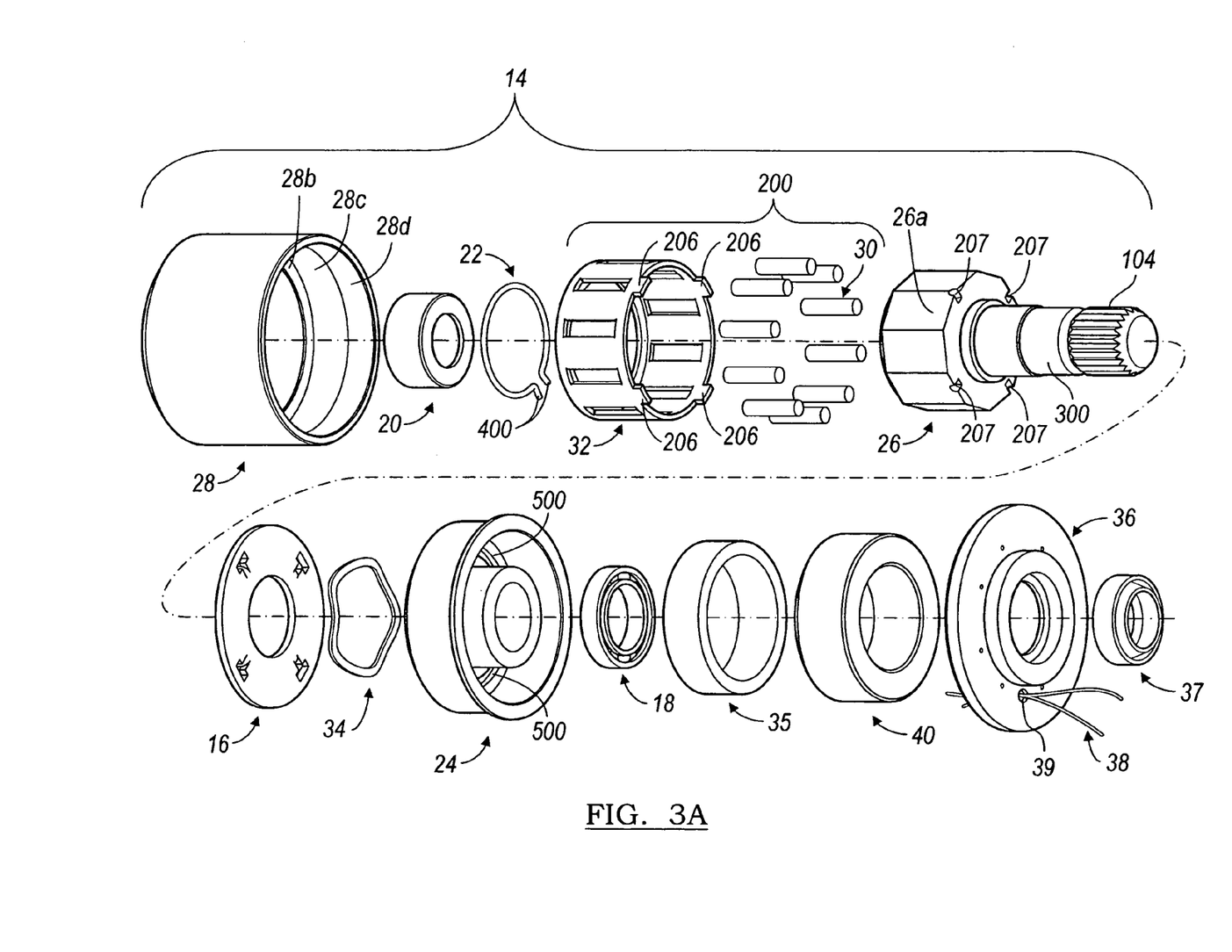
FIG. 3A illustrates a front exploded view of the clutch system of FIG. 2.
Figure 3B:
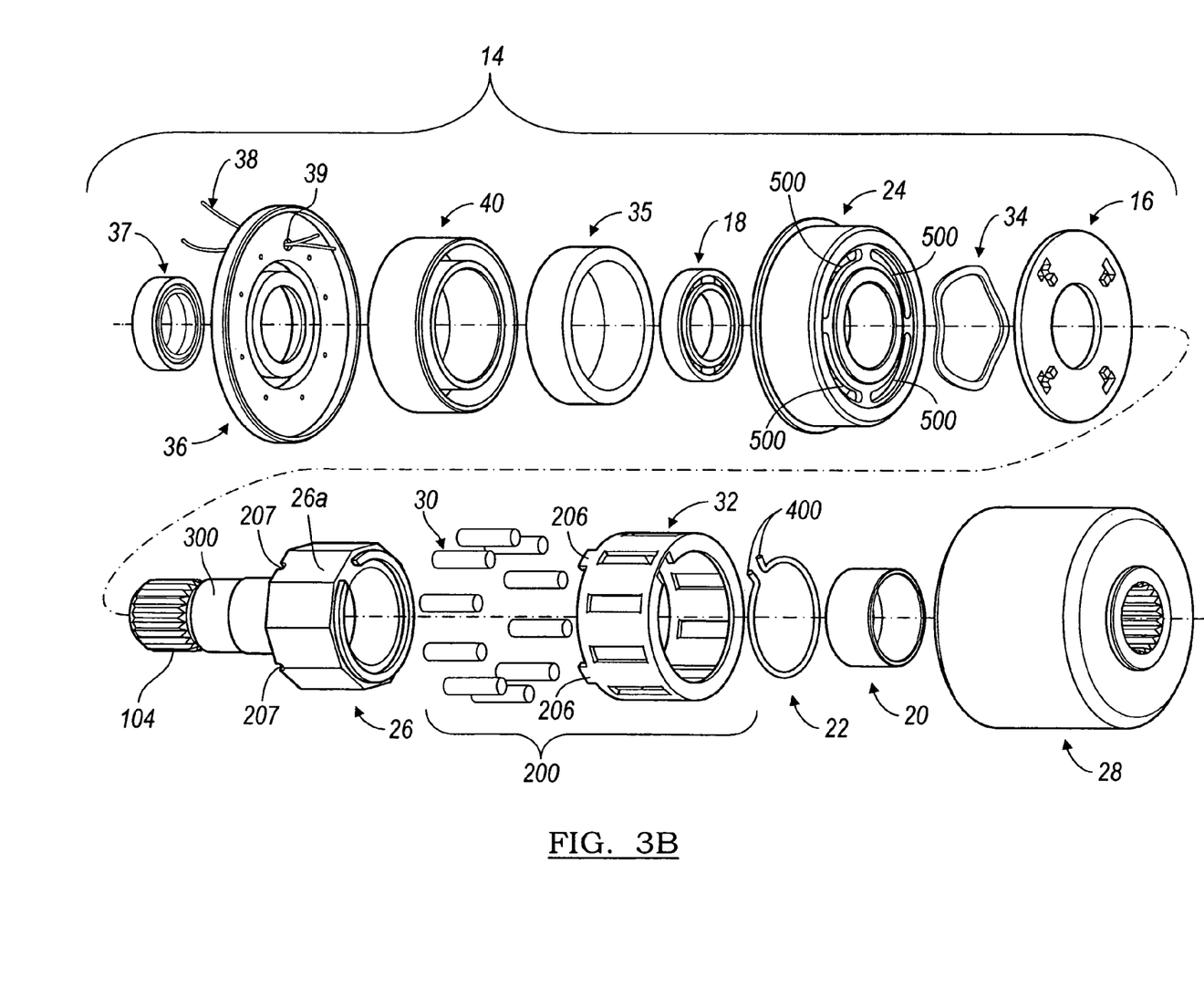
FIG. 3B illustrates a rear exploded view of the clutch system of FIG. 2.
Figure 4A:
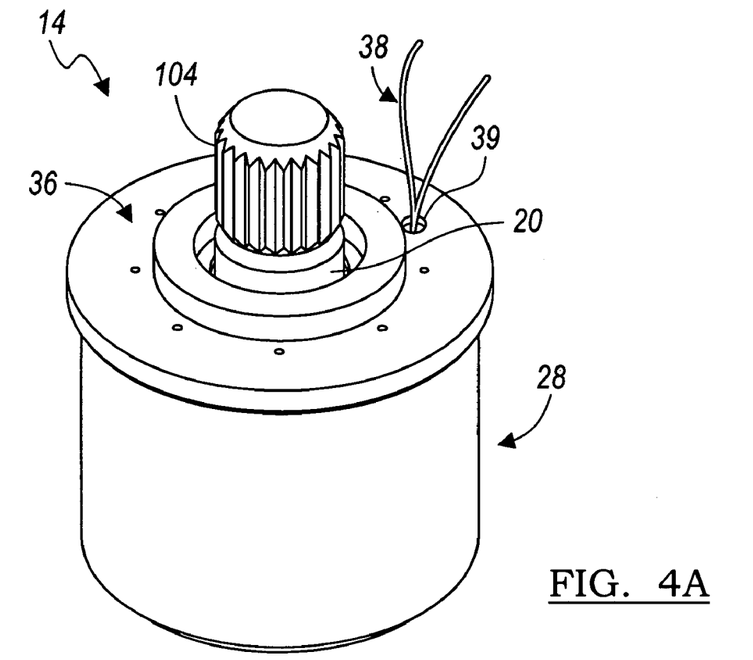
FIG. 4A illustrates a top perspective view of the clutch system of FIG. 2.
Figure 4B:
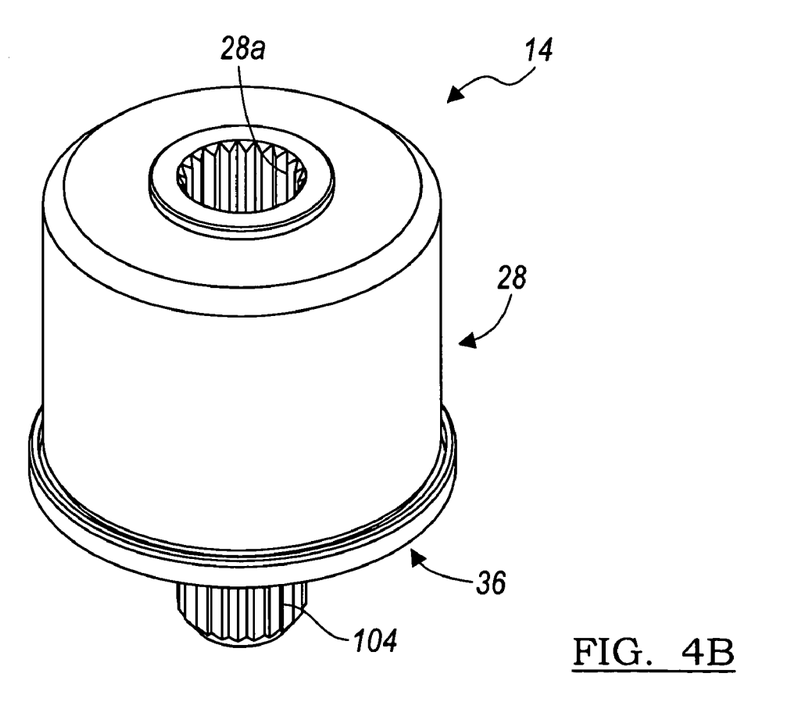
FIG. 4B illustrates a rear perspective view of the clutch system of FIG. 2.

Referring to the Figures generally, and specifically to FIG. 1, there is shown a torque transmission system 10, wherein system 10 includes a differential system 12 and a clutch system 14 in operable association therewith. By way of a non-limiting example, differential system 12 can be either the front and/or rear differential systems of a vehicle, such as but not limited to those vehicles that employ front wheel drive, rear wheel drive, four-wheel drive, and/or all-wheel drive systems. Additionally, system 10 and system 14 can be used in conjunction with any driving member/driven member system.

Referring to FIGS. 1-4B, the primary components of clutch system 14 can include, without limitation, an actuation disk 16, a bearing 18, an inner race bushing 20, a centering spring 22, a coil rotor 24, an inner race 26, an outer race 28, a plurality of rollers 30, a retainer or roller cage 32, a wave spring 34, a coil member 35, an endplate member 36, and a seal member 37 (e.g., lip seal, can seal, O-ring, and/or the like). A wire member or harness 38 can be provided and is operable to be in communication with coil member 35, e.g., through an aperture 39 formed in endplate member 36. A coil housing 40 is also provided to house the coil member 35. It should be appreciated that other components, such as fastening members (e.g. screws, bolts, and/or the like), bearings, bushings, seals, gaskets, springs, and/or the like can also be employed, as is known in the art.

Clutch system 14 has the outer race 28 splined through female spline portion 28a to the pinion shaft 100 of the front differential 102, while the inner race 26 has a splined extension 104 to connect to the front driveshaft (not shown). The inner race 26 envelopes the hub section 106 of the outer race 28, providing additional support and structural stability. More importantly, the entire clutch system 14 is operable to easily slide into an extended portion 108 of the differential pinion housing 110 and is sealed in place by endplate member 36.

Clutch system 14 is compact, simple, and has a relatively small number of components. An important feature of the present invention is that clutch system 14 does not require its own separate housing, i.e., clutch system 14 is installed into and surrounded by extended portion 108 of the existing differential pinion housing 110, and so requires only minor modifications to existing casting molds.

Furthermore, the present invention does not require internal seals, so clutch system 14 can simultaneously use the differential lubricant, thus obviating the need for two different lubrications systems. The seal member 37 is fitted into endplate member 36, thus allowing clutch system 14 to be less complex and costly to manufacture.

Referring to FIGS. 1-4B and 6-7, actuation disk 16 is intended to function as the trigger mechanism to force engagement of the roller clutch system 200. Actuation disk 16, which can be comprised of a simple stamped disk with short axial, bent tabs 202, is part of the electromagnetic trigger clutch, clamping axially onto coil rotor 24 when coil member 35 is energized. Slots 204 in actuation disk 16 engage axial tabs 206 on retainer 32, allowing actuation disk 16 to move axially relative to retainer 32, but preventing relative rotation of these two parts. When coil member 35 is energized, the magnetic flux in coil rotor 24 attracts actuation disk 16 (e.g., overcoming the axial force of wave spring 34) until actuation disk 16 clamps onto coil rotor 24. The frictional force generated between coil rotor 24 and actuation disk 16 forces retainer 32 to rotate with coil rotor 24 (and thus outer race 28), overcomes the force of centering spring 22, and forces rollers 30 to move along the flat, cammed surfaces 26a of inner race 26 until rollers 30 wedge into engagement between the flat cammed surfaces and the inner diameter of outer race 28. Coil rotor 24 is preferably pressed into an inner diameter surface of outer race 28. The inner diameter of actuation disk 16 also provides radial support for retainer 32 and maintains close relative positioning of retainer 32 with respect to inner race 26.

Referring to FIGS. 1-4B and 6-9, bent axial tabs 202 of actuation disk 16 engage notches 207 on inner race 26 to lock actuation disk 16 in the disengaged position unless magnetic flux (e.g., from coil rotor 24) brings actuation disk 16 axially out of this locked out position. This feature allows for the prevention of inadvertent actuation which could damage clutch system 14. This feature is especially important during cold weather conditions and high speed overrunning conditions, e.g., when there is a large speed difference between the inner and outer races 26, 28, respectively. Under these conditions, it is possible that the viscous shear of the lubricant between coil rotor 24 and actuation disk 16 can overcome the centering spring 22 force, causing retainer 32 to rotate relative to inner race 26, causing the roller clutch system 200 to engage, even though the electromagnetic coil rotor 24 was not energized. With these axial tabs 202 engaged into their receptor areas (e.g., notches 207) of inner race 26, clutch system 14 cannot be engaged under any such conditions.

Actuation disk 16 should be made of a suitable magnetic material such as but not limited to SAE 1008 or SAE 1012 steel. By way of a non-limiting example, a somewhat tight tolerance is specified on the inner diameter thereof to hold close positioning of retainer 32 relative to inner race 26.

Bearing 18 is disposed between the coil member 35 and endplate member 36 and the shaft portion 300 of inner race 26. Bearing 18 is intended to be used to locate the coil member 35 relative to the rest of the electromagnetic trigger clutch components, providing closer tolerance and better positioning than conventional journal bushings. Bearing 18 can be pressed onto shaft 300 of inner race 26 with the coil member 35 and endplate member 36, keeping the whole clutch system 14 together during shipping and installation. Bearing 18 in the coil member 35 and endplate member 36 combination also positions the whole clutch system 14 within housing 110 (specifically extended portion 108), so the need for any outer bushings and/or rotor bushings can be eliminated. By eliminating the outer bushing, the relative speed difference between the rotating clutch assembly and the stationary housing is handled much better and frictional heating is reduced. The diameter of shaft 300 of inner race 26 onto which bearing 18 can be pressed is the same one that the seal lips ride upon. The close tolerances and smooth finish required for bearing 18 press are also used for the seal lips, which also require a smooth finish.

Inner race bushing 20 is intended to function as a journal bushing between inner race 26 and hub section 106 of outer race 28. The material can be bearing bronze or any other suitable bearing-type material such as but not limited to TORLON or NYLON66. Somewhat tight tolerances are required to maintain close positioning of outer race 28 relative to inner race 26 to provide good actuation of the roller clutch system 200 and prevent inadvertent actuation.

Centering spring 22 is intended to hold retainer 32 in position relative to inner race 26. More specifically, this spring 22 is inserted into a groove or recess in inner race 26 and has radial tabs 400 which extend outwardly, engaging retainer 32 to urge retainer 32 into a position in which rollers 30 are held in the middle of the flat sections 26*a* of inner race 26, on which position clutch system 14 is effectively disengaged. When this biasing force of centering spring 22 is overcome, radial tabs 400 of centering spring 22 deflect and retainer 32 can rotate relative to inner race 26, allowing rollers 30 to move along the flat sections 26*a* of inner race 26 until they engage outer race 28, engaging the roller clutch system 200.

Centering spring 22 can be comprised of any suitable spring steel. Although the current design of centering spring 22 is an "omega" shape, other shapes are possible, as long as retainer 32 can be held in position relative to inner race 26, but overcome when the "trigger" clutch system engages.

Coil rotor 24 is intended to be pressed into the open end of outer race 28 and serves to focus the magnetic flux from the stationary coil member 35 upon actuation disk 16 to "trigger" the actuation of the roller clutch system 200. Axial slots 500 of approximately 60-70 degrees are cut or otherwise formed in the circumferential direction in the face of coil rotor 24, forcing magnetic flux to "jump" across the smaller air gap to actuation disk 16, drawing actuation disk 16 axially until it clamps onto this axial face of coil rotor 24.

Relatively tight tolerances are required on the coil rotor 24 outer diameter and inner diameter of the outer race 28 to press coil rotor 24 into outer race 28. The coil rotor 24 can be comprised of any suitable magnetic material, such as but not limited to SAE 1008 or SAE 1012 steel.

The press-in feature of coil rotor 24 is intended to keep all the components into one assembly, making the unit easier to ship. Coil rotor 24 is the last part of the assembly that gets installed and is pressed into the open end of outer race 28. Coil rotor 24, once assembled to clutch system 14, holds all the components into the envelope described by outer race 28, wherein only the input shaft section 300 of inner race 26 protrudes. The press fit is sufficient to keep all the parts together, even if the assembly is picked up by the input shaft, dropped, shaken, or pulled upon manually. This feature allows for clutch system 14 to be shipped, handled, and installed intact, with no chance of the assembly coming apart inadvertently. From a manufacturer's standpoint (and that of prospective customers), this is a great advantage because clutch system 14 can be shipped complete, ready to install, with no additional hardware installation.

Inner race 26 includes a series of flat cammed surfaces 26*a* that are intended to function as the inner part of the roller clutch system 200, engaging rollers 30 and wedging them against the inner diameter of outer race 28, locking up clutch system 14. As previously noted, inner race 26 also has shaft 300 that extends axially out of the assembly to engage the input driveshaft (not shown), preferably with a splined connection 104. Shaft 300 also has a smooth surface to allow the outboard seal 37 (installed in the endplate member 36) to ride smoothly to prevent leakage of differential lubricant and keep out dust, dirt, debris and water.

With inner race 26 surrounding hub section 106 of outer race 28, this relationship can be maintained more easily. Side loading caused by the sharp torque spikes encountered during acceleration is carried by inner race 26/input shaft through inner race bushing 20 into this hub section 106. Any movement of the inner race 26 caused by this moment loading will act upon the outer race 28, minimizing relative movement between these two components. The hub section 106 of the outer race 28 also serves as the output, connecting to the pinion shaft, usually by a spline. Moving this splined section inside the envelope of the inner race 26 reduces overall axial length of the assembly, allowing a shorter front driveshaft, providing more efficient transmission of torque and better NVH (i.e., noise, vibration, harshness) characteristics.

Referring to FIGS. 6-9, recessed notches 207 are included in the outer section of inner race 26 to mate with male axial tabs 202 on actuation disk 16 to serve as a lock-out mechanism and prevent inadvertent actuation. A recessed diameter is provided on the end opposite shaft 300 to fit over inner race bushing 20 to provide close relative positioning of race bushing 20 to provide close relative positioning of inner race 26 relative to outer race 28. On the same side of the inner race 26 as this recessed section is a semi-circular extension into which centering spring 22 is installed. A radial gap in this extension allows the radial tabs 400 of centering spring 22 to extend outwards to engage retainer 32. Tight tolerances are required on the diameters that run against inner race bushing 20. In addition, tight tolerances are called out for the flat sections so that close control is possible of the positions of rollers 30 during actuation to equalize the forces at each roller, ensure coincidental engagement of all of rollers, and prevent inadvertent actuation.

Outer race 28 includes a hub section 106 with a female spline for connection to the differential pinion gear shaft. The outer surface of this hub section 106 fits into inner race bushing 20 which then fits into inner race 26, providing critical, close relative positioning of these two raceways. The outer section of outer race 28 has three different inner diameters, 28*b*, 28*c*, and 28*d*, respectively. The smallest diameter, 28*b*, with the thickest wall section constitutes the outer diameter of the clutch section, providing the contact surface for rollers 30 and the thickness to withstand the considerable hoop stresses generated when clutch system 14 engages. The diameter 28*d* closest to the "open" end of outer race 28 is the contact surface into which coil rotor 24 is pressed as the last part of assembly of roller clutch system 200. The intermediate diameter 28*c* provides a small air gap between coil rotor 24 and outer race 28 to prevent short-circuiting of the magnetic flux, improving performance of the electromagnetic trigger clutch.

Outer race 28 is typically made of hardened, bearing quality steel to resist brinnelling and deformation due to the high Hertzian contact stresses generated by the engagement of the roller clutch. However, non-bearing grade materials could also be used if the stresses were kept low enough.

Outer race 28 is connected to the pinion shaft (output) and inner race 26 is connected to the input shaft (driveshaft). This is generally the reverse of conventional clutch systems where the inner race is splined onto the pinion shaft and the outer race has a female spline connection for mating to the front driveshaft. In contrast, the present invention has the "open" end of the assembly facing outwards, allowing the coil member 35 to be on the outside with the inherent advantages of installation (e.g., coil insertion and wiring connections) and reduction in the number of components.

Like outer race 28, inner race 26 would preferably be made of hardened, bearing quality steel to provide good wear characteristics and suitable resistance to the high Hertzian contact forces generated when the clutch is engaged under high torque conditions.

Rollers 30 can be standard needle rollers to allow the lowest possible cost. Preferably, rollers 30 will have no crowning, allowing equal distribution of the contact forces across rollers 30 and serve to prevent skewing during engagement. Rollers 30 will have typical tight tolerances and would be made of suitable hardened steel.

Roller cage or retainer 32 is intended to function to position rollers 30 relative to inner race 26. Preferably, rollers 30 are maintained in identical positions relative to the flat cammed surfaces 26a of inner race 26. On this same end is a diameter which runs against a mating diameter of inner race 26 to keep close positioning of these two parts. Retainer 32 has a radial notch in one end to mate with the radial tabs 400 of centering spring 22, maintaining the relative positions of inner race 26 and retainer 32. Axial tabs 206 are provided at one end of retainer 32 to fit into slots 204 in actuation disk 16. These slots 204 are closely toleranced to allow axial movement of actuation disk 16 relative to retainer 32, but prevent relative rotation of the two parts. With these features, actuation disk 16 can move axially to engage coil rotor 24 when the electromagnetic clutch is energized, and actuation disk 16 will force retainer 32 to rotate with it in either direction, engaging roller clutch system 200.

Wave spring 34 is intended to function to urge actuation disk 16 away from coil rotor 24 to facilitate disengagement when coil member 35 is de-energized. The axial force of this wave spring 34 must be balanced against the force generated by the electromagnetic clutch. If wave spring force is too high, then actuation disk 16 cannot move axially when coil member 35 is energized, preventing engagement of the roller clutch system 200. Conversely, if the axial force of wave spring 34 is too small, then disengagement could be slowed or inhibited altogether, particularly during extremely cold weather conditions when the lubricant gets very viscous. When installed, wave spring 34 is held in a groove on the axial face of coil rotor 24. This part is relatively simple and inexpensive, and other types of springs or similar mechanisms could be used to urge actuation disk 16 away from coil rotor 24.

Figure 5:
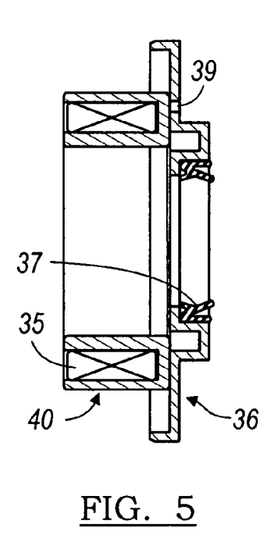
FIG. 5 illustrates a seal member/endplate-coil assembly of the clutch system of FIG. 2.
Figure 6:
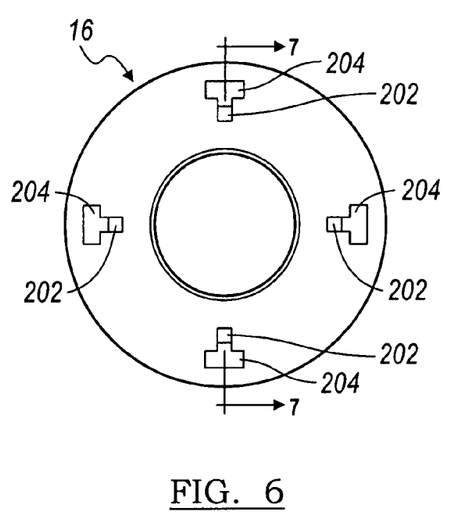
FIG. 6 illustrates a plan view of an actuation disk, in accordance with the clutch system of FIG. 2.
Figure 7:
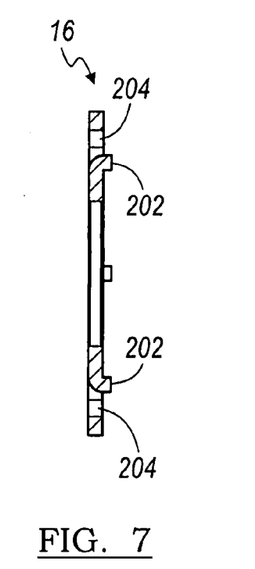
FIG. 7 illustrates a sectional view taken along line 7-7 of FIG. 6, in accordance with the clutch system of FIG. 2.
Figure 8:
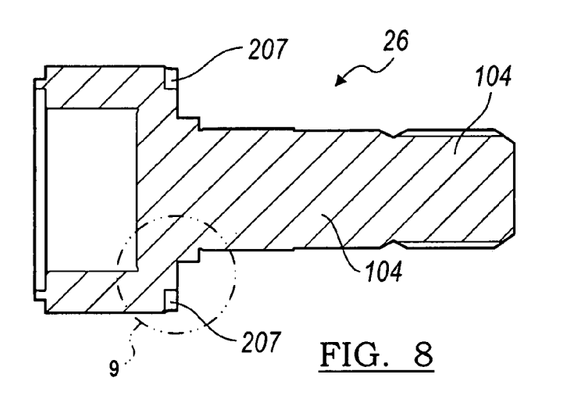
FIG. 8 illustrates a sectional view of an inner race lock out notches, in accordance with the clutch system of FIG. 2.
Figure 9:
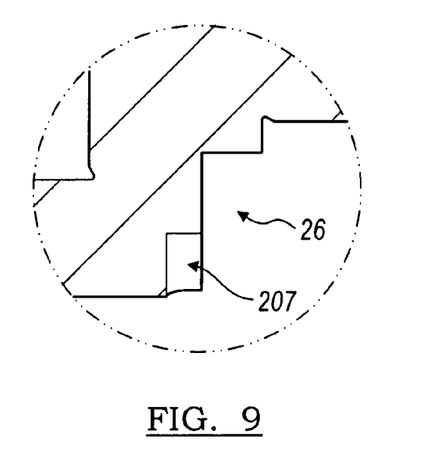
FIG. 9 illustrates a partial sectional view of detail area 9 of FIG. 8.

Endplate member 36 is intended to enclose and seal the open end of clutch system 14 and is in proximity to coil rotor 24 and actuation disk 16. The coil wires 38 (not shown) exit from the back of the coil housing directly through the endplate member 36. Therefore, they don't have to be snaked through a small hole 39 at the bottom of a long cylindrical hole in the clutch housing, like conventional clutch systems. Therefore, the endplate member 36 and coil member 35 can be shipped as a single unit from the coil manufacturer with the connector in place, rather than attaching it after the wires have been routed through the housing. This allows much quicker and easier installation, with the wires being simply snap-connected to the vehicle's wiring harness (not shown). By way of a non-limiting example, coil member 35/endplate member 36 combination is the last part installed, serving as the external seal and allowing easier routing of the coil wires 38. The seal member 37 is then fitted over the combination of the endplate member 36 and coil member 35, which is shown in FIG. 5. The coil housing 40 is spot welded to the endplate member 36 with features to provide an interface with a standard lip seal on the inner diameter thereof. The outer diameter of the endplate member 36 seals against an O-ring (not shown) fitted into the inner diameter of the outer housing. This sealing coil member 35/coil housing 40/endplate member 36 combination is held in place with a snap ring (not shown) and/or the like.

The present invention provides several advantages over conventional clutch systems, such as: (1) the new design fits into an extension of the existing differential housing, reducing cost and complexity; (2) there are no internal seals, so the assembly uses the differential lubricant; (3) the coil member/endplate member combination is the last part installed, serving as the external seal and allowing easier routing of the coil rotor wires; (4) the inner race fits over a hub section of the outer race, providing additional structural stability and stiffness; (5) axial tabs stamped into the actuation disk fit into notches on the outer section of the inner race, providing a low cost method of preventing inadvertent actuation; (6) the press-in coil rotor acts to keep all the components into one assembly, making the unit easier to ship (an alternative design for this rotor includes a snap-fit to the outer race, also keeping the assembly together while also reducing cost and weight, isolating the magnetic flux paths for better performance and also serving as the outer journal bushing to reduce friction against the outer housing); and (7) the outer race is connected to the pinion shaft (output) and the inner race is connected to the input shaft (driveshaft).

While the present invention is primarily intended for use in conjunction with ATV's, it could also be practiced with many other automotive applications including any number of different types of multi-wheel vehicles. And while the present invention is primarily intended for mounting on the front differential of a rear-wheel drive four wheeled vehicle, it could also be used on the rear differential of a front-drive vehicle, for example.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A selectively operable clutch system for a vehicle, comprising:
   an inner race member;
   an outer race member, a portion of which is disposed about a portion of the inner race member, said outer race member having a hub portion at least partially enveloped by said inner race member;
   an actuation member operably associated with the inner race member; and
   an actuation system operably associated with the actuation member;
   wherein the actuation system is operable to cause the actuation member to either engage or disengage the inner race member;
   wherein when the actuation member is engaged with the inner race member, the clutch system is not operable to apply a torque force to a drivable member;

wherein when the actuation member is disengaged from the inner race member, the clutch system is operable to apply a torque force to a drivable member.

2. The invention according to claim 1, further comprising a roller clutch system operably associated with the inner and outer race members, wherein the roller clutch system includes a plurality of roller members and a retainer member operably associated therewith.

3. The invention according to claim 2, wherein when the actuation member disengages from the inner race member, the roller clutch system is operable to cause the inner and outer race members to rotate together in the same direction.

4. The invention according to claim 2, wherein the retainer member includes at least one tab member extending from a surface thereof.

5. The invention according to claim 4, wherein the actuation member comprises a disk member, wherein the disk member includes at least one tab member extending from a major face thereof and at least one area defining a slot formed in a major face thereof.

6. The invention according to claim 5, wherein the inner race member includes at least one area defining a notch formed in a surface thereof.

7. The invention according to claim 5, wherein the at least one slot of the disk member is selectively operable to engage the at least one tab member of the retainer member.

8. The invention according to claim 6, wherein the tab member of the disk member is selectively operable to engage the notch of the inner race member.

9. The invention according to claim 1, further comprising an endplate member, wherein the endplate member is operably associated with the actuation system.

10. The invention according to claim 1, wherein the actuation system comprises a selectively energizable coil member.

11. The invention according to claim 10, wherein the coil member is fastened to the endplate member.

12. The invention according to claim 11, further comprising a wire member, wherein the wire member is in communication with the coil member, wherein the wire member is operable to be received through an area defining an aperture formed in the endplate member.

13. The invention according to claim 1, further comprising a rotor coil member, wherein the rotor coil member is operable to be at least partially received within the outer race member, wherein the rotor coil member frictionally engages an inner surface of the outer race member.

14. A selectively operable clutch system for a vehicle, comprising:
an inner race member;
an outer race member, a portion of which is disposed about a portion of the inner race member, said outer race member having a hub portion at least partially enveloped by said inner race member;
a roller clutch system operably associated with the inner and outer race members;
an actuation member operably associated with the inner race member; and
an actuation system operably associated with the actuation member;
wherein the actuation system is operable to cause the actuation member to either engage or disengage the inner race member;
wherein when the actuation member disengages from the inner race member, the roller clutch system is operable to cause the inner and outer race members to rotate together in the same direction;
wherein when the actuation member is engaged with the inner race member, the roller clutch system is not operable to apply a torque force to a drivable member;
wherein when the actuation member is disengaged from the inner race member, the roller clutch system is operable to apply a torque force to a drivable member.

15. The invention according to claim 14, wherein the roller clutch system includes a plurality of roller members and a retainer member operably associated therewith.

16. The invention according to claim 14, wherein the retainer member includes at least one tab member extending from a surface thereof.

17. The invention according to claim 16, wherein the actuation member comprises a disk member, wherein the disk member includes at least one tab member extending from a major face thereof and at least one area defining a slot formed in a major face thereof.

18. The invention according to claim 17, wherein the inner race member includes at least one area defining a notch formed in a surface thereof.

19. The invention according to claim 17, wherein the at least one slot of the disk member is selectively operable to engage the at least one tab member of the retainer member.

20. The invention according to claim 18, wherein the tab member of the disk member is selectively operable to engage the notch of the inner race member.

21. The invention according to claim 14, further comprising an endplate member, wherein the endplate member is operably associated with the actuation system.

22. The invention according to claim 14, wherein the actuation system comprises a selectively energizable coil member.

23. The invention according to claim 22, wherein the coil member is fastened to the end plate member.

24. The invention according to claim 23, further comprising a wire member, wherein the wire member is in communication with the coil member, wherein the wire member is operable to be received through an area defining an aperture formed in the endplate member.

25. The invention according to claim 14, further comprising a rotor coil member, wherein the rotor coil member is operable to be at least partially received within the outer race member, wherein the rotor coil member frictionally engages an inner surface of the outer race member.

26. A selectively operable torque transmission system for a vehicle, comprising:
a differential system disposed within a housing; and
a clutch system;
wherein the housing includes an extended portion operable to receive at least a portion of the clutch system;
wherein the clutch system is operably associated with the differential system;
wherein the clutch system comprises:
an inner race member;
an outer race member, a portion of which is disposed about a portion of the inner race member, said outer race member having a hub portion at least partially enveloped by said inner race member;
a roller clutch system operably associated with the inner and outer race members;
an actuation member operably associated with the inner race member; and
an actuation system operably associated with the actuation member;
wherein the actuation system is operable to cause the actuation member to either engage or disengage the inner race member;

wherein when the actuation member disengages from the inner race member, the roller clutch system is operable to cause the inner and outer race members to rotate together in the same direction;

wherein when the actuation member is engaged with the inner race member, the roller clutch system is not operable to apply a torque force to a drivable member;

wherein when the actuation member is disengaged from the inner race member, the roller clutch system is operable to apply a torque force to a drivable member.

27. The invention according to claim 26, further comprising a roller clutch system operably associated with the inner and outer race members, wherein the roller clutch system includes a plurality of roller members and a retainer member operably associated therewith.

28. The invention according to claim 26, wherein the retainer member includes at least one tab member extending from a surface thereof.

29. The invention according to claim 28, wherein the actuation member comprises a disk member, wherein the disk member includes at least one tab member extending from a major face thereof and at least one area defining a slot formed in a major face thereof.

30. The invention according to claim 29, wherein the inner race member includes at least one area defining a notch formed in a surface thereof.

31. The invention according to claim 29, wherein the at least one slot of the disk member is selectively operable to engage the at least one tab member of the retainer member.

32. The invention according to claim 30, wherein the tab member of the disk member is selectively operable to engage the notch of the inner race member.

33. The invention according to claim 26, further comprising an endplate member, wherein the endplate member is operably associated with the actuation system.

34. The invention according to claim 26, wherein the actuation system comprises a selectively energizable coil member.

35. The invention according to claim 34, wherein the coil member is fastened to the end plate member.

36. The invention according to claim 35, further comprising a wire member, wherein the wire member is in communication with the coil member, wherein the wire member is operable to be received through an area defining an aperture formed in the endplate member.

37. The invention according to claim 26, further comprising a rotor coil member, wherein the rotor coil member is operable to be at least partially received within the outer race member, wherein the rotor coil member frictionally engages an inner surface of the outer race member.

38. A selectively operable torque transmission system for a vehicle comprising:
a differential system disposed within a non-rotative housing; and
a clutch system;
wherein the housing includes an extended portion operable to receive at least a portion of the clutch system;
wherein the clutch system is operably associated with the differential system;
wherein the clutch system comprises:
an inner race member;
an outer race member, a portion of which is disposed about a portion of the inner race member said outer race member having a hub portion at least partially enveloped by said inner race member;
an actuation member operably associated with the inner race member; and
an actuation system operably associated with the actuation member;
wherein the actuation system is operable to cause the actuation member to either engage or disengage the inner race member;
wherein when the actuation member is engaged with the inner race member, the clutch system is not operable to apply a torque force to a drivable member;
wherein when the actuation member is disengaged from the inner race member, the clutch system is operable to apply a torque force to a drivable member.

* * * * *